US012445459B2

(12) United States Patent
Goyal

(10) Patent No.: US 12,445,459 B2
(45) Date of Patent: Oct. 14, 2025

(54) DETECTING MALICIOUS MOBILE APPLICATIONS USING MACHINE LEARNING IN A CLOUD-BASED SYSTEM

(71) Applicant: Zscaler, Inc., San Jose, CA (US)

(72) Inventor: Rohit Goyal, Mohali (IN)

(73) Assignee: Zscaler, Inc., San Jose, CA (US)

( * ) Notice: Subject to any disclaimer, the term of this patent is extended or adjusted under 35 U.S.C. 154(b) by 280 days.

(21) Appl. No.: 17/064,634

(22) Filed: Oct. 7, 2020

(65) Prior Publication Data
US 2022/0070183 A1  Mar. 3, 2022

(30) Foreign Application Priority Data

Aug. 25, 2020 (IN) .............................. 202011036631

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01)

(58) Field of Classification Search
CPC ..... H04L 63/1416; H04L 29/06; G06N 20/00; G06N 3/006; G06F 21/566; G06F 21/554
See application file for complete search history.

(56) References Cited

U.S. PATENT DOCUMENTS

| 7,693,059 | B2 | 4/2010 | Osenbach et al. |
| 8,695,059 | B2 | 4/2014 | Kopti |
| 9,019,962 | B1 | 4/2015 | Ghosh |
| 9,119,109 | B1 * | 8/2015 | Dubrovsky ............. H04L 47/20 |
| 9,621,574 | B2 | 4/2017 | Desai et al. |
| 9,667,486 | B2 * | 5/2017 | Gokhale ............. H04L 41/0809 |
| 9,935,955 | B2 | 4/2018 | Desai et al. |
| 10,243,997 | B2 | 3/2019 | Desai et al. |
| 11,323,486 | B2 * | 5/2022 | Verma ..................... H04W 4/02 |
| 12,010,174 | B2 * | 6/2024 | Binder ..................... G07C 3/02 |

(Continued)

FOREIGN PATENT DOCUMENTS

CN        101917439 A    * 12/2010

OTHER PUBLICATIONS

Title: An On-Demand WebRTC and IoT Device Tunneling Service for Hospitals Author(s): Thomas Sandholm, Boris Magnusson, and Bjorn A Johnsson Year: 2014 Publisher: IEEE.*

*Primary Examiner* — Shahriar Zarrineh
(74) *Attorney, Agent, or Firm* — Baratta Law PLLC; Lawrence A. Baratta, Jr.; Ryan Odessa

(57) ABSTRACT

Systems and methods for detecting malicious mobile applications using machine learning in a cloud-based system utilize a traffic forwarding technique and a cloud-based Machine Learning (ML) model to assess the security of apps installed on a user device. This architecture enables the cloud-based system to have visibility of user devices, train the ML model in real-time with a vast amount of mobile app data from multiple users, and enforce security on the user devices from the cloud-based system. Advantageously, the ML model is trained with a vast amount of mobile traffic, leading to better accuracy of prediction. The cloud-based system can be multi-tenant (enterprise), have a large user base, be spread over a large geographic area, etc. This provides a great opportunity for training data. Feedback from live production data can be fed back into the ML model.

14 Claims, 8 Drawing Sheets

(56) References Cited

U.S. PATENT DOCUMENTS

| | | | | |
|---|---|---|---|---|
| 2002/0141365 | A1* | 10/2002 | Leung | H04N 21/235 370/335 |
| 2006/0130141 | A1* | 6/2006 | Kramer | H04L 63/1408 726/23 |
| 2007/0094723 | A1* | 4/2007 | Short | H04L 69/16 726/14 |
| 2010/0027549 | A1 | 2/2010 | Satterlee et al. | |
| 2010/0125903 | A1 | 5/2010 | Devarajan et al. | |
| 2012/0281706 | A1 | 11/2012 | Agarwal et al. | |
| 2013/0061306 | A1 | 3/2013 | Sinn | |
| 2014/0020062 | A1 | 1/2014 | Tumula et al. | |
| 2015/0135302 | A1 | 5/2015 | Cohen et al. | |
| 2015/0282041 | A1 | 10/2015 | Batchu et al. | |
| 2016/0142374 | A1 | 5/2016 | Clark | |
| 2016/0154960 | A1* | 6/2016 | Sharma | G06F 21/577 726/25 |
| 2016/0353401 | A1* | 12/2016 | Tapia | H04W 24/02 |
| 2016/0359685 | A1* | 12/2016 | Yadav | H04L 41/142 |
| 2017/0237773 | A1* | 8/2017 | Wallace | H04L 9/0643 726/22 |
| 2017/0279803 | A1 | 9/2017 | Desai et al. | |
| 2017/0279849 | A1* | 9/2017 | Weibel | G06N 3/006 |
| 2017/0308701 | A1* | 10/2017 | Nandha Premnath | G06F 21/53 |
| 2017/0331859 | A1* | 11/2017 | Bansal | H04L 63/029 |
| 2018/0018459 | A1* | 1/2018 | Zhang | G06F 21/566 |
| 2018/0183794 | A1* | 6/2018 | Desai | H04L 67/125 |
| 2018/0288062 | A1 | 10/2018 | Goyal et al. | |
| 2019/0158540 | A1* | 5/2019 | Mahaffey | H04L 63/105 |
| 2019/0222434 | A1* | 7/2019 | Ye | H04L 67/141 |
| 2019/0258781 | A1* | 8/2019 | Qureshi | H04W 12/64 |
| 2019/0349337 | A1* | 11/2019 | Glazemakers | H04L 63/0272 |
| 2019/0370686 | A1* | 12/2019 | Pezzillo | G06N 5/048 |
| 2020/0021528 | A1* | 1/2020 | Sharma | H04L 47/21 |
| 2020/0145432 | A1* | 5/2020 | Verma | H04W 12/08 |
| 2020/0195439 | A1* | 6/2020 | Suresh | H04L 9/3213 |
| 2020/0259640 | A1* | 8/2020 | Leavy | H04L 9/0841 |
| 2020/0259792 | A1* | 8/2020 | Devarajan | H04L 63/1416 |
| 2021/0092095 | A1* | 3/2021 | Kim | H04L 63/0876 |
| 2021/0124615 | A1* | 4/2021 | Klingenbrunn | G06F 9/3004 |
| 2021/0281492 | A1* | 9/2021 | Di Pietro | H04L 41/0631 |
| 2021/0288881 | A1* | 9/2021 | Zhang | H04L 47/825 |
| 2021/0352047 | A1* | 11/2021 | Singh | H04L 61/2592 |
| 2022/0060446 | A1* | 2/2022 | Dalvi | H04L 63/1425 |

\* cited by examiner

DETECTING MALICIOUS MOBILE APPLICATIONS USING MACHINE LEARNING IN A CLOUD-BASED SYSTEM

FIELD OF THE DISCLOSURE

The present disclosure generally relates to computer networking systems and methods. More particularly, the present disclosure relates to systems and methods for detecting malicious mobile applications using machine learning in a cloud-based system.

BACKGROUND OF THE DISCLOSURE

With the proliferation of mobile devices ("user device") in the enterprise, Information Technology (IT) administrators can no longer ignore these devices as outside their scope of responsibility. Mobile devices are now as powerful as laptop computers. Employees want to access corporate data and the Internet through wireless networks such as Wi-Fi hotspots or cellular data networks that are outside the control of IT. On mobile devices, the line between enterprise and personal usage is blurred. Since the enterprise typically does not own the device or may allow the user to use the device for both business and personal, enforcing policies for acceptable usage or installing application controls as a traditional IT administrator would on a corporate PC, is often not viable for a Bring Your Own Device (BYOD) scenario. Mobile devices and corresponding mobile applications ("apps") are becoming the default endpoint for conducting all sorts of business. As such, the need to ensure the security of these devices is paramount. As is well-known, users can install various apps on a mobile device such as through application stores. The pace of new mobile app development is astonishing, and it is extremely difficult to ensure the security of new mobile apps. Malicious actors can provide so-called malicious apps that can leak personal information, passwords, financial information, photos/videos, etc. That is, a malicious app can be used to create a security hole on a mobile device.

There are existing Machine Learning (ML) tools for detecting malicious apps using static and/or dynamic analysis. Generally, a static analysis evaluates specific features while a dynamic analysis executes the app and evaluates results. Both of these techniques try to simulate the user experience and derive results. However, these ML applications lack the real user traffic from which they can train their classifiers in real-time. This lack of real user traffic leads to ineffective training data.

BRIEF SUMMARY OF THE DISCLOSURE

The present disclosure relates to systems and methods for detecting malicious mobile applications using machine learning in a cloud-based system. This approach utilizes a cloud-based system with a traffic forwarding technique and a cloud-based ML model to assess the security of apps installed on a user device. This architecture enables the cloud-based system to have visibility of user devices, train the ML model in real-time with a vast amount of mobile app data from multiple users, and enforce security on the user devices from the cloud-based system. Advantageously, the ML model is trained with a vast amount of mobile traffic, leading to better accuracy of prediction. For example, the cloud-based system can be multi-tenant (enterprise), have a large user base, be spread over a large geographic area, etc. This provides a great opportunity for training data. Feedback from live production data can be fed back into the ML model. For example, new malicious apps can be detected in the cloud-based system and used to train/update the ML model. This enables quick detection of new malicious apps as well as the ability to update the ML model classifier in real-time for zero-hour protection. The traffic forwarding enables the cloud-based system to have a view of the apps on user devices connected thereto, and the traffic forwarding can be decoupled from the ML model in the cloud-based system.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

DETAILED DESCRIPTION OF THE DISCLOSURE

Again, the present disclosure relates to systems and methods for detecting malicious mobile applications using machine learning in a cloud-based system. This approach utilizes a cloud-based system with a traffic forwarding technique and a cloud-based ML model to assess the security of apps installed on a user device. This architecture enables the cloud-based system to have visibility of user devices, train the ML model in real-time with a vast amount of mobile app data from multiple users, and enforce security on the user devices from the cloud-based system. Advantageously, the ML model is trained with a vast amount of mobile traffic, leading to better accuracy of prediction. For example, the cloud-based system can be multi-tenant (enterprise), have a large user base, be spread over a large geographic area, etc. This provides a great opportunity for training data. Feedback from live production data can be fed back into the ML model. For example, new malicious apps can be detected in the cloud-based system and used to train/update the ML model. This enables quick detection of new malicious apps as well as the ability to update the ML model classifier in real-time for zero-hour protection. The traffic forwarding enables the cloud-based system to have a view of the apps on user devices connected thereto, and the traffic forwarding can be decoupled from the ML model in the cloud-based system.

Example Cloud-Based System Architecture

Figure 1:
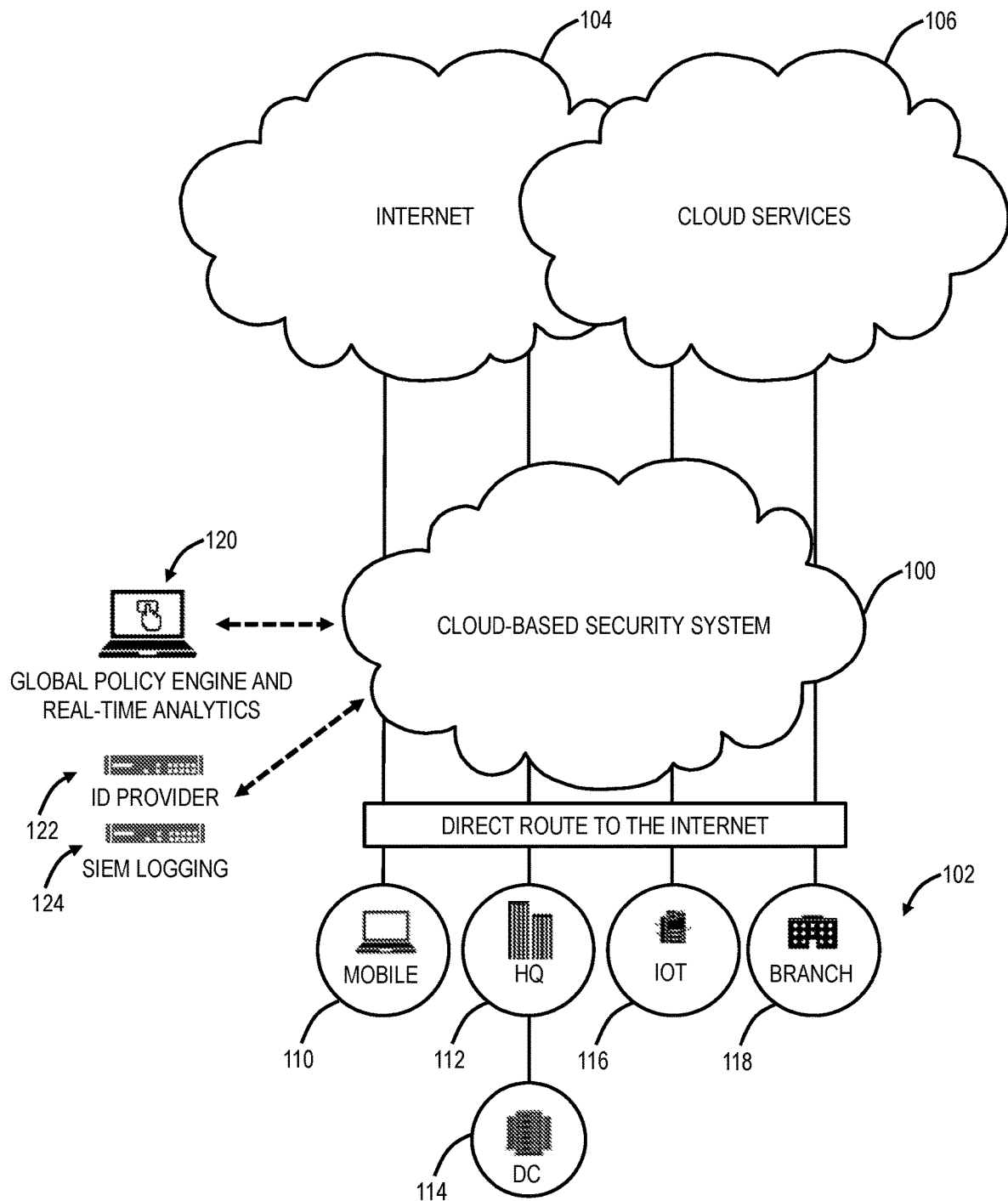
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
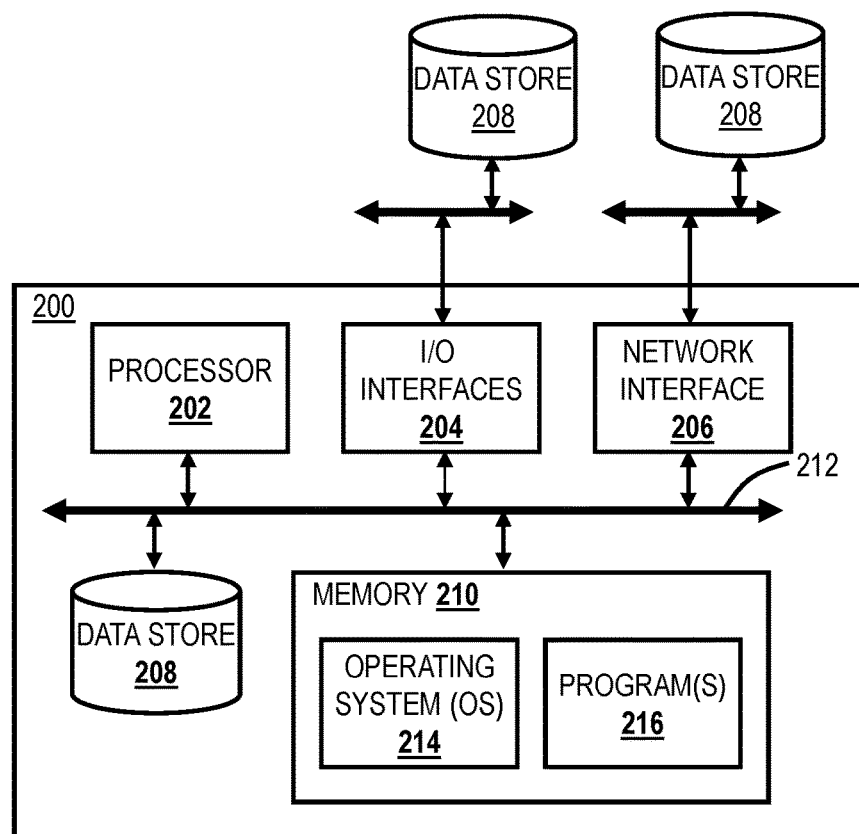

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
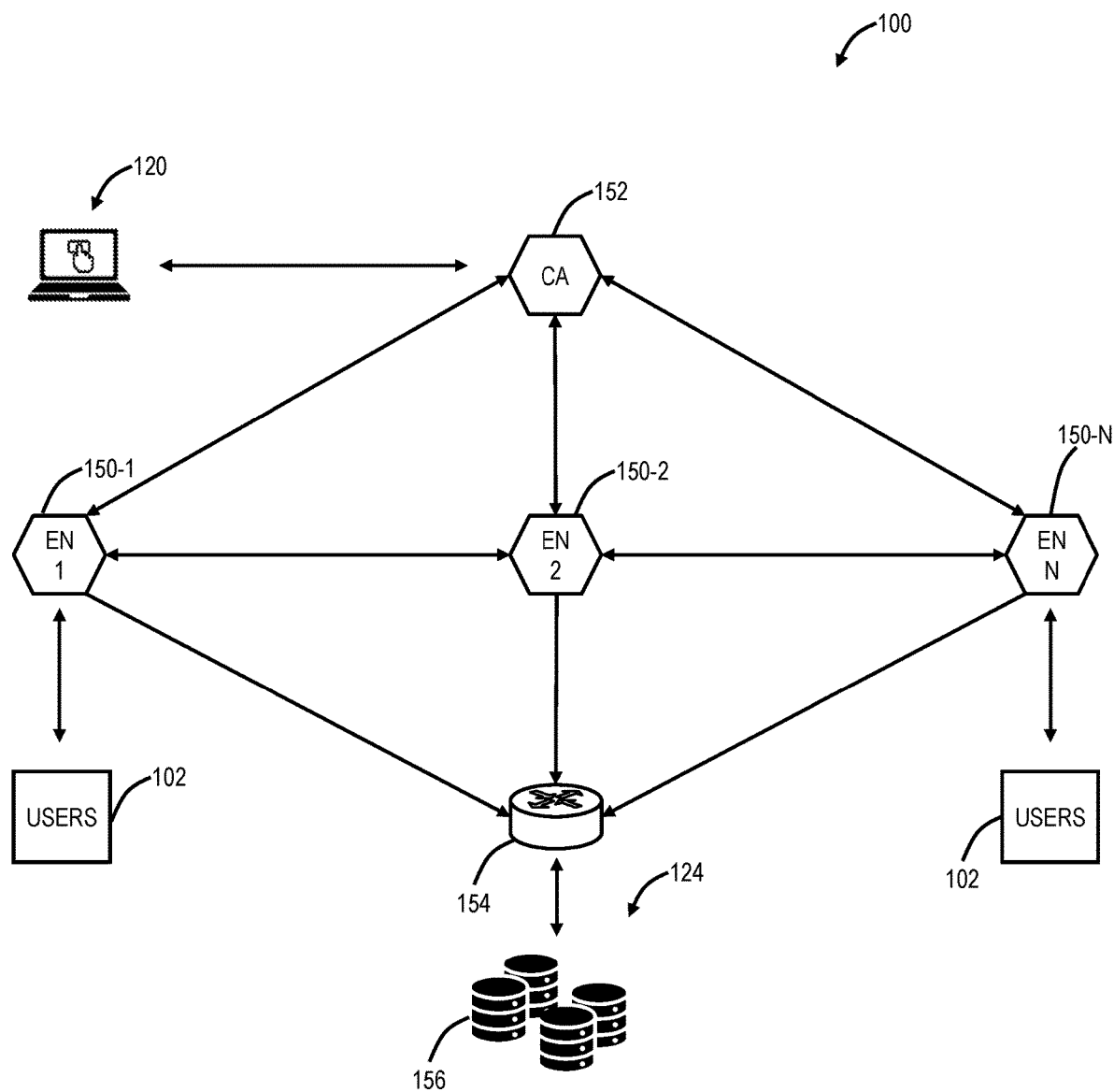
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is process through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
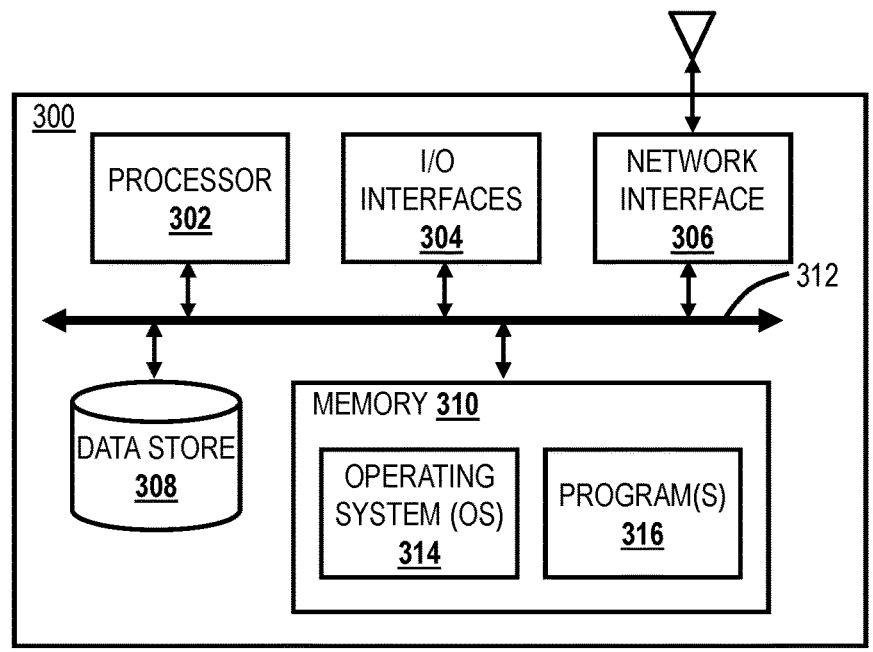

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The present disclosure relates to mobile devices, which are one subset of the user device 300. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include but are not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 5:
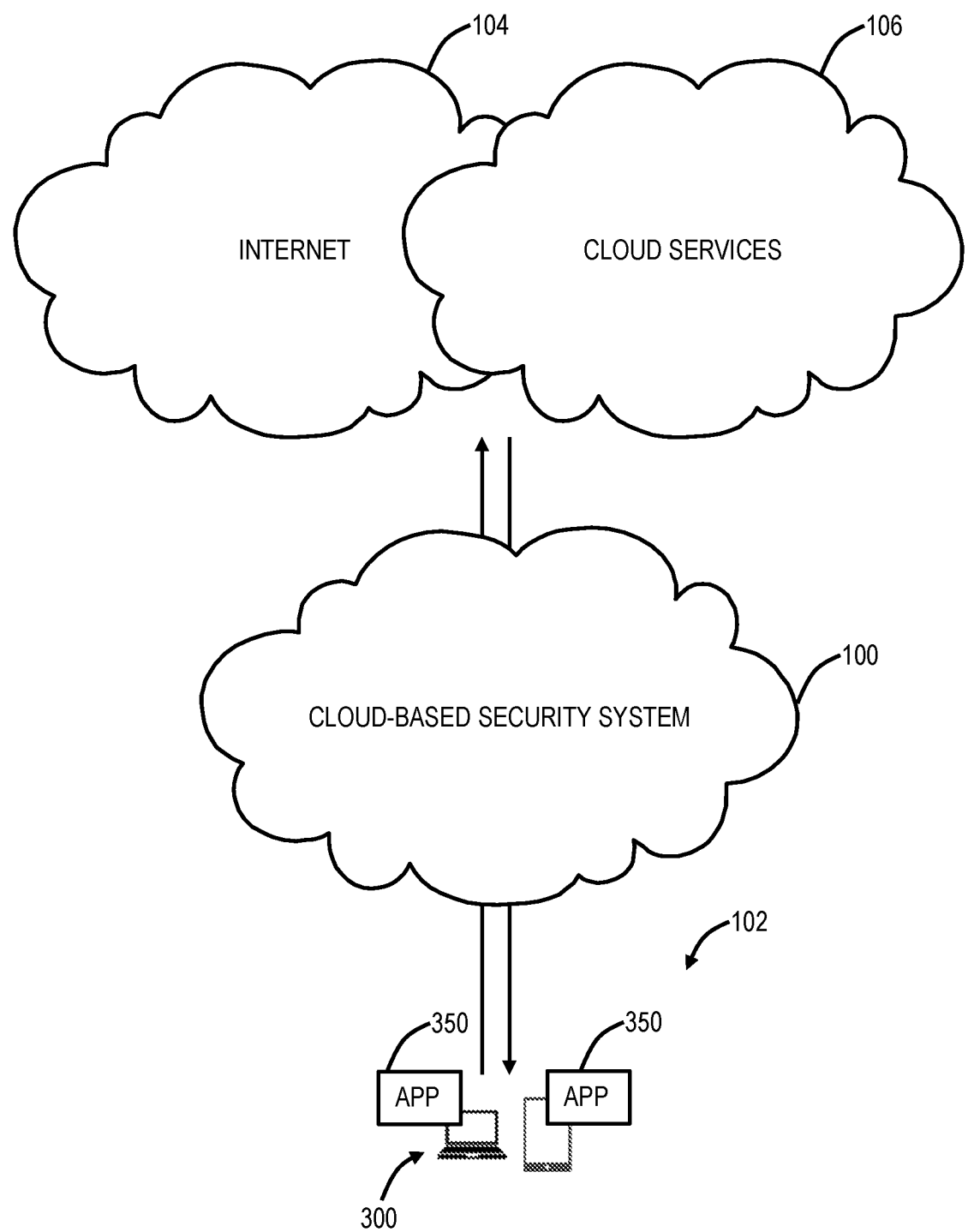
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

Cloud Tunnel

Figure 6:
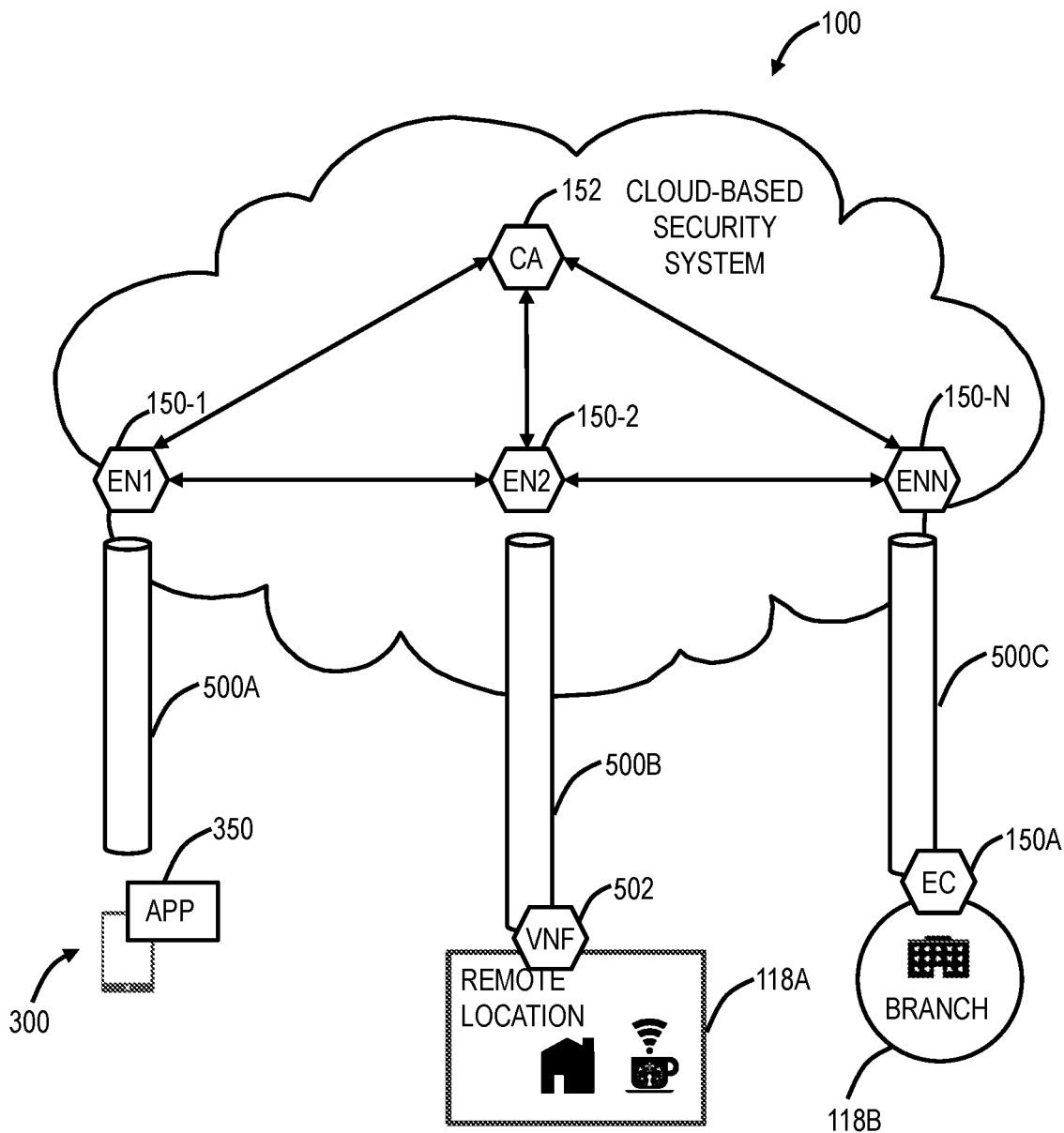
FIG. 6 is a network diagram of the cloud-based system of FIGS. 1 and 2 with various cloud tunnels, labeled as cloud tunnels, for forwarding traffic.
Figure 7:
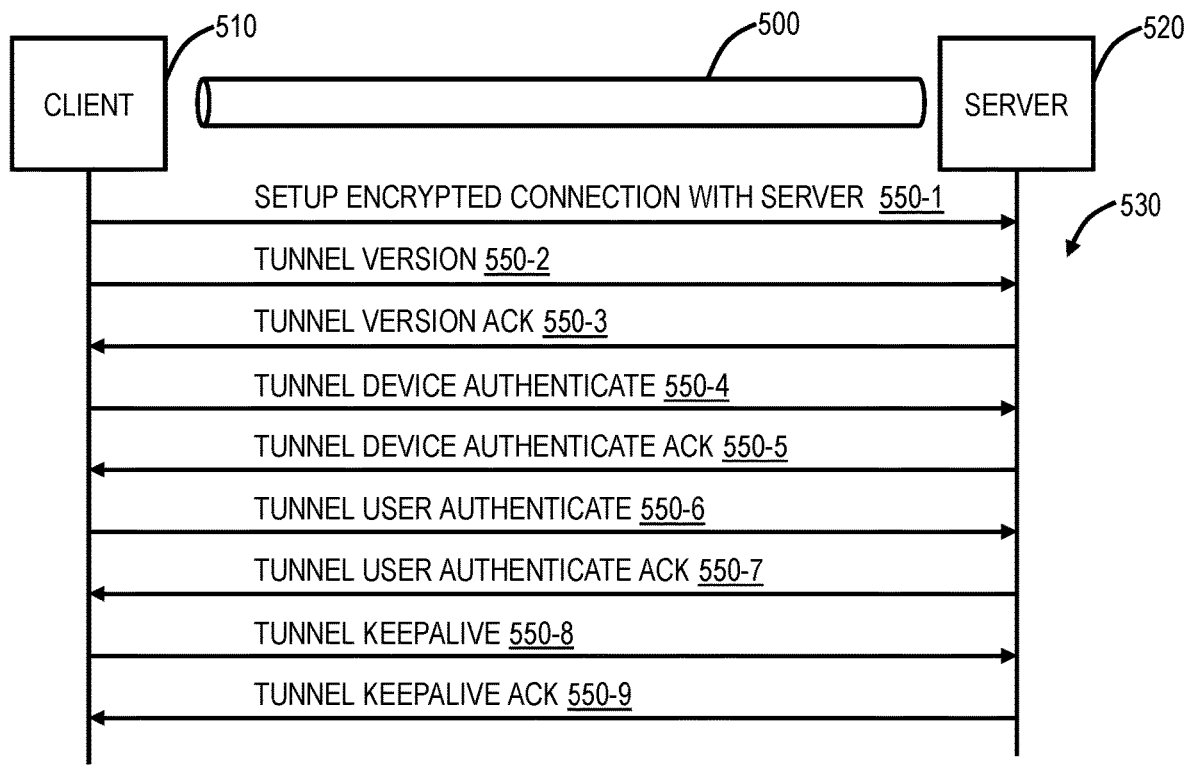
FIGS. 7 and 8 are flow diagrams of a cloud tunnel illustrating a control channel (FIG. 7) and a data channel (FIG. 8), with the tunnel illustrated between a client and a server.
Figure 8:
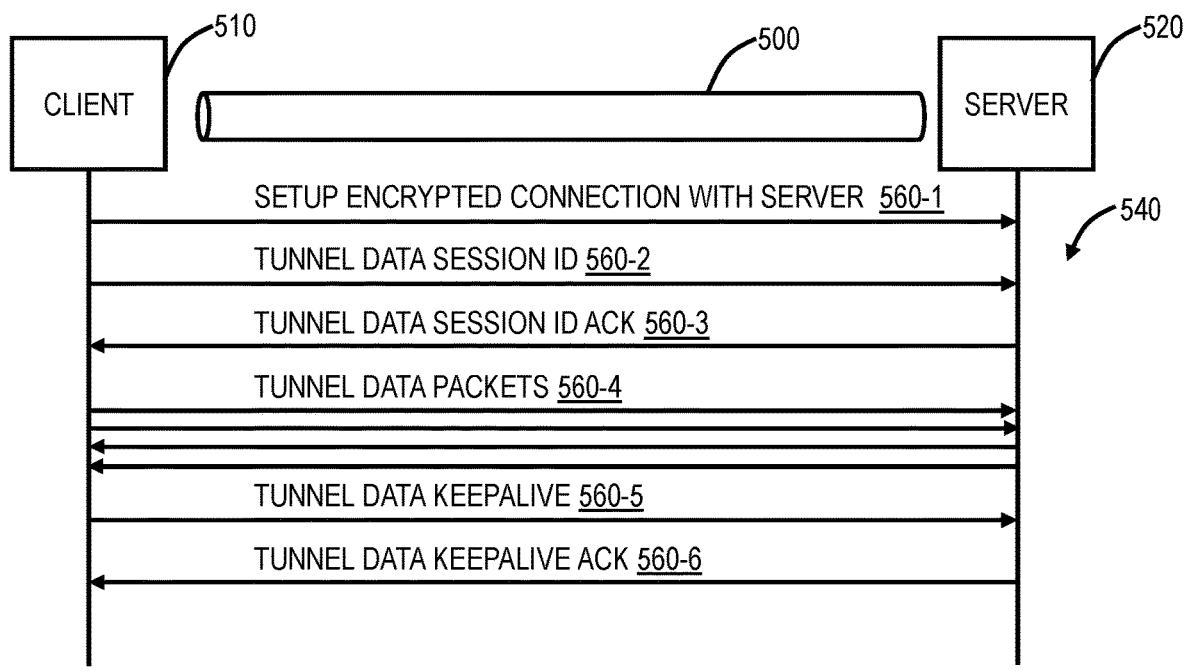

FIG. 6 is a network diagram of the cloud-based system 100 with various cloud tunnels 500, labeled as cloud tunnels 500A, 500B, 500C, for forwarding traffic. FIGS. 7 and 8 are flow diagrams of a cloud tunnel 500 illustrating a control channel (FIG. 7) and a data channel (FIG. 8), with the tunnel illustrated between a client 510 and a server 520. The cloud tunnel 500 is a lightweight tunnel that is configured to forward traffic between the client 510 and the server 520. The present disclosure focuses on the specific mechanisms used in the cloud tunnel 500 between two points, namely the client 510 and the server 520. Those skilled in the art will recognize the cloud tunnel 500 can be used with the cloud-based system 100 as an example use case, and other uses are contemplated. That is, the client 510 and the server 520 are just endpoint devices that support the exchange of data traffic and control traffic for the tunnel 500. For description, the server 520 can be referred to as a local node and the client 510 as a remote node, where the tunnel operates between the local and remote nodes.

In an embodiment, the cloud-based system 100 can use the cloud tunnel 500 to forward traffic to the enforcement nodes 150, such as from a user device 300 with the application 350, from a branch office/remote location 118, etc. FIG. 6 illustrates three example use cases for the cloud tunnel 500 with the cloud-based system 100, and other uses are also contemplated. In a first use case, a cloud tunnel 500A is formed between a user device 300, such as with the application 350, and an enforcement node 150-1. For example, when a user 102 associated with the user device 300 connects to a network, the application 350 can establish the cloud tunnel 500A to the closest or best enforcement node 150-1, and forward the traffic through the cloud tunnel 500A so that the enforcement node 150-1 can apply the appropriate security and access policies. Here, the cloud tunnel 500A supports a single user 102, associated with the user device 300.

In a second use case, a cloud tunnel 500B is formed between a Virtual Network Function (VNF) 1102 or some other device at a remote location 118A and an enforcement node 150-2. Here, the VNF 1102 is used to forward traffic from any user 102 at the remote location 118A to the enforcement node 150-2. In a third use case, a cloud tunnel 110C is formed between an on-premises enforcement node, referred to as an Edge Connector (EC) 150A, and an enforcement node 150-N. The edge connector 150A can be located at a branch office 118A or the like. In some embodiments, the edge connector 150A can be an enforcement node 150 in the cloud-based system 100 but located on-premises with a tenant. Here, in the second and third use cases, the cloud tunnels 500B, 500C support multiple users 102.

There can be two versions of the cloud tunnel 500, referred to a tunnel 1 and tunnel 2. The tunnel 1 can only support Web protocols as an HTTP connect tunnel operating on a TCP streams. That is, the tunnel 1 can send all proxy-aware traffic or port 80/443 traffic to the enforcement node 150, depending on the forwarding profile configuration. This can be performed via CONNECT requests, similar to a traditional proxy.

The tunnel 2 can support multiple ports and protocols, extending beyond only web protocols. As described herein, the cloud tunnels 500 are the tunnel 2. In all of the use cases, the cloud tunnel 500 enables each user device 300 to redirect traffic destined to all ports and protocols to a corresponding enforcement node 150. Note, the cloud-based system 100 can include load balancing functionality to spread the cloud tunnels 500 from a single source IP address. The cloud tunnel 500 supports device logging for all traffic, firewall, etc., such as in the storage cluster 156. The cloud tunnel 500 utilizes encryption, such as via TLS or DTLS, to tunnel packets between the two points, namely the client 510 and the server 520. As described herein, the client 510 can be the user device 300, the VNF 1102, and/or the edge connector 150A, and the server 520 can be the enforcement node 150. Again, other devices are contemplated with the cloud tunnel 500.

The cloud tunnel 500 can use a Network Address Translation (NAT) device that does not require a different egress IP for each device's 300 separate sessions. Again, the cloud tunnel 500 has a tunneling architecture that uses DTLS or TLS to send packets to the cloud-based system 100. Because of this, the cloud tunnel 500 is capable of sending traffic from all ports and protocols.

Thus, the cloud tunnel 500 provides complete protection for a single user 102, via the application 350, as well as for multiple users at remote locations 118, including multiple security functions such as cloud firewall, cloud IPS, etc. The cloud tunnel 500 includes user-level granularity of the traffic, enabling different users 102 on the same cloud tunnel 500 for the enforcement nodes 150 to provide user-based granular policy and visibility. In addition to user-level granularity, the cloud tunnel 500 can provide application-level granularity, such as by mapping mobile applications (e.g., Facebook, Gmail, etc.) to traffic, allowing for app-based granular policies.

FIGS. 7 and 8 illustrate the two communication channels, namely a control channel 530 and a data channel 540, between the client 510 and the server 520. Together, these two communication channels 530, 540 form the cloud tunnel 500. In an embodiment, the control channel 530 can be an encrypted TLS connection or SSL connection, and the control channel 530 is used for device and/or user authentication and other control messages. In an embodiment, the data channel 540 can be an encrypted DTLS or TLS connection, i.e., the data channel can be one or more DTLS or TLS connections for the transmit and receive of user IP packets. There can be multiple data channels 540 associated with the same control channel 530. The data channel 540 can be authenticated using a Session Identifier (ID) from the control channel 530.

Of note, the control channel 530 always uses TLS because some locations (e.g., the remote location 118A, the branch office 118B, other enterprises, hotspots, etc.) can block UDP port 443, preventing DTLS. Whereas TLS is widely used and not typically blocked. The data channel 540 preferably uses DTLS, if it is available, i.e., not blocked on the client 530. If it is blocked, the data channel 540 can use TLS instead. For example, DTLS is the primary protocol for the data channel 540 with TLS used as a fallback over TCP port 443 if DTLS is unavailable, namely if UDP port 443 is blocked at the client 530.

Figure 9:
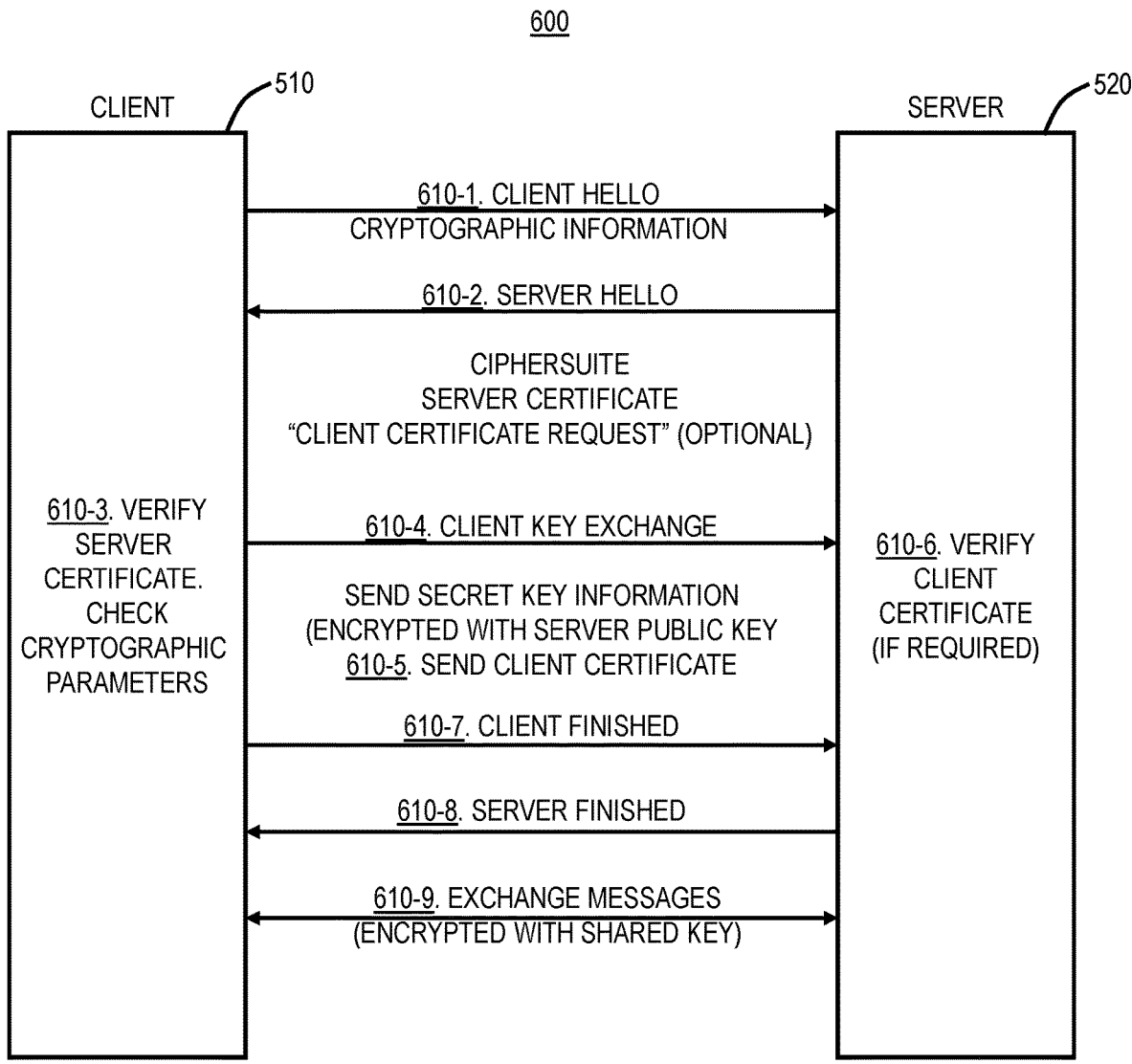
FIG. 9 is a flow diagram of details of a handshake process between the client and the server.

In FIG. 7, the control channel 530 is illustrated with exchanges between the client 510 and the server 520. Again, the control channel 530 includes TLS encryption, which is established through a setup or handshake between the client 510 and the server 520 (step 550-1). An example of a handshake is illustrated in FIG. 9. The client 510 can send its version of the tunnel 500 to the server 520 (step 550-2) to which the server 520 can acknowledge (step 550-3). For example, the version of the tunnel can include a simple version number or other indication, as well as an indication of whether the client 510 supports DTLS for the data channel 540. Again, the control channel 530 is fixed with TLS or SSL, but the data channel 540 can be either DTLS or TLS.

The client 510 can perform device authentication (step 550-4), and the server 520 can acknowledge the device authentication (step 550-5). The client 510 can perform user authentication (step 550-6), and the server 520 can acknowledge the user authentication (step 550-7). Note, the device authentication includes authenticating the user device 300, such as via the application 350, the VNF 502, the edge connector 150A, etc. The user authentication includes authenticating the users 102 associated with the user devices 300. Note, in an embodiment, the client 510 is the sole device 300, and here the user authentication can be for the user 102 associated with the client 510, and the device authentication can be for the user device 300 with the application 350. In another embodiment, the client 510 can have multiple user devices 300 and corresponding users 102 associated with it. Here, the device authentication can be for the VNF 502, the edge connector 150A, etc., and the user authentication can be for each user device 300 and corresponding user 102, and the client 510 and the server 520 can have a unique identifier for each user device 300, for user-level identification.

The device authentication acknowledgment can include a session identifier (ID) that is used to bind the control channel 530 with one or more data channels 540. The user authentication can be based on a user identifier (ID) that is unique to each user 102. The client 510 can periodically provide keep alive packets (step 550-8), and the server 510 can respond with keep alive acknowledgment packets (step 550-9). The client 510 and the server 520 can use the keep alive packets or messages to maintain the control channel 530. Also, the client 510 and the server 520 can exchange other relevant data over the control channel 530, such as metadata, which identifies an application for a user 102, location information for a user device 300, etc.

In FIG. 8, similar to FIG. 7, the data channel 540 is illustrated with exchanges between the client 510 and the server 520. Again, the data channel 540 includes TLS or DTLS encryption, which is established through a setup or handshake between the client 510 and the server 520 (step 560-1). An example of a handshake is illustrated in FIG. 9. Note, the determination of whether to use TLS or DTLS is based on the session ID, which is part of the device authentication acknowledgment, and which is provided over the data channel 540 (steps 560-2, 560-3). Here, the client 510 has told the server 520 its capabilities, and the session ID reflects what the server 520 has chosen, namely TLS or DTLS, based on the client's 510 capabilities. In an embodiment, the server 520 chooses DTLS if the client 510 supports it, i.e., if UDP port 443 is not blocked, otherwise the server 520 chooses TLS. Accordingly, the control channel 530 is established before the data channel 540. The data channel 540 can be authenticated based on the session ID from the control channel 530.

The data channel 540 includes the exchange of data packets between the client 510 and the server 520 (step 560-4). The data packets include an identifier such as the session ID and a user ID for the associated user 102. Additionally, the data channel 540 can include keep alive packets between the client 510 and the server 520 (steps 560-5, 560-6).

The cloud tunnel 500 can support load balancing functionality between the client 510 and the server 520. The server 520 can be in a cluster, i.e., multiple servers 200. For example, the server 520 can be an enforcement node 150 cluster in the cloud-based system 100. Because there can be multiple data channels 540 for a single control channel 530, it is possible to have the multiple data channels 540, in a single cloud tunnel 500, connected to different physical servers 200 in a cluster. Thus, the cloud-based system 100 can include load balancing functionality to spread the cloud tunnels 500 from a single source IP address, i.e., the client 510.

Also, the use of DTLS for the data channels 540 allows the user devices 300 to switch networks without potentially impacting the traffic going through the tunnel 500. For example, a large file download could continue uninterrupted when a user device 300 moves from Wi-Fi to mobile, etc. Here, the application 350 can add some proprietary data to the DTLS client-hello servername extension. That proprietary data helps a load balancer balance the new DTLS connection to the same server 200 in a cluster where the connection before network change was being processed. So, a newly established DTLS connection with a different IP address (due to network change) can be used to tunnel packets of the large file download that was started before the network change. Also, some mobile carriers use different IP addresses for TCP/TLS (control channel), and UDP/DTLS (data channel) flows. The data in DTLS client-hello helps the load balancer balance the control and data connection to the same server 200 in the cluster.

User and Application-Level Awareness

The tunnel 500 is aware of every user based on the user ID, which is associated with data packets on the data channel 540. This allows the cloud-based system 100 to apply per user-level functions on data traffic where there are multiple users 102 on the tunnel 500. In another embodiment, a user 102 can be operating a mobile device for the user device 300. Many mobile apps are not differentiated in transit. Here, in an embodiment, the application 350 can have the ability to dump operating system network connection tables, derive application or process (names) associated with established connections (TCP/UDP), and tag ab application ID on every packet over the data channel 540. In such a manner, the tunnel 500 can support both per user and per application-level awareness.

Encryption Handshake Process

FIG. 9 is a flow diagram of details of a handshake process 600 between the client 510 and the server 520. Again, the client 510 and the server 520 are labeled as such but could be any two endpoints of a cloud tunnel 500. The client 510 sends a "client hello" message that lists cryptographic information such as the SSL/TLS/DTLS version and, in the client's order of preference, the CipherSuites supported by the client 510 (step 610-1). The message also contains a random byte string that is used in subsequent computations. The protocol allows for the "client hello" to include the data compression methods supported by the client 510.

The server 520 responds with a "server hello" message that contains the CipherSuite chosen by the server 520 from the list provided by the client 510, the session ID, and another random byte string (step 610-2). The server 520 also sends its digital certificate. If the server 520 requires a digital certificate for client authentication, the server 520 sends a "client certificate request" that includes a list of the types of certificates supported and the Distinguished Names of acceptable CAs. The client 510 verifies the server's 520 digital certificates (step 610-3).

The client 510 sends the random byte string that enables both the client 510 and the server 520 to compute the secret key to be used for encrypting subsequent message data (step 510-4). The random byte string itself is encrypted with the server's 520 public key. In an embodiment, for the data channel 540, the random byte string can be the session ID, which of course, is not random. If the server 520 sent a "client certificate request," the client 510 sends a random byte string encrypted with the client's private key, together with the client's 510 digital certificates, or a "no digital certificate alert" (step 610-5). This alert is only a warning, but with some implementations, the handshake fails if client authentication is mandatory. The server 520 verifies the client's certificate if required (step 610-6).

The client 510 sends the server a "finished" message, which is encrypted with the secret key, indicating that the client 510 part of the handshake is complete (step 610-7). The server 520 sends the client 510 a "finished" message, which is encrypted with the secret key, indicating that the server 520 part of the handshake is complete. For the duration of the session, the server 520 and client 510 can now exchange messages that are symmetrically encrypted with the shared secret key (step 610-9).

Machine Learning Process

Figure 10:
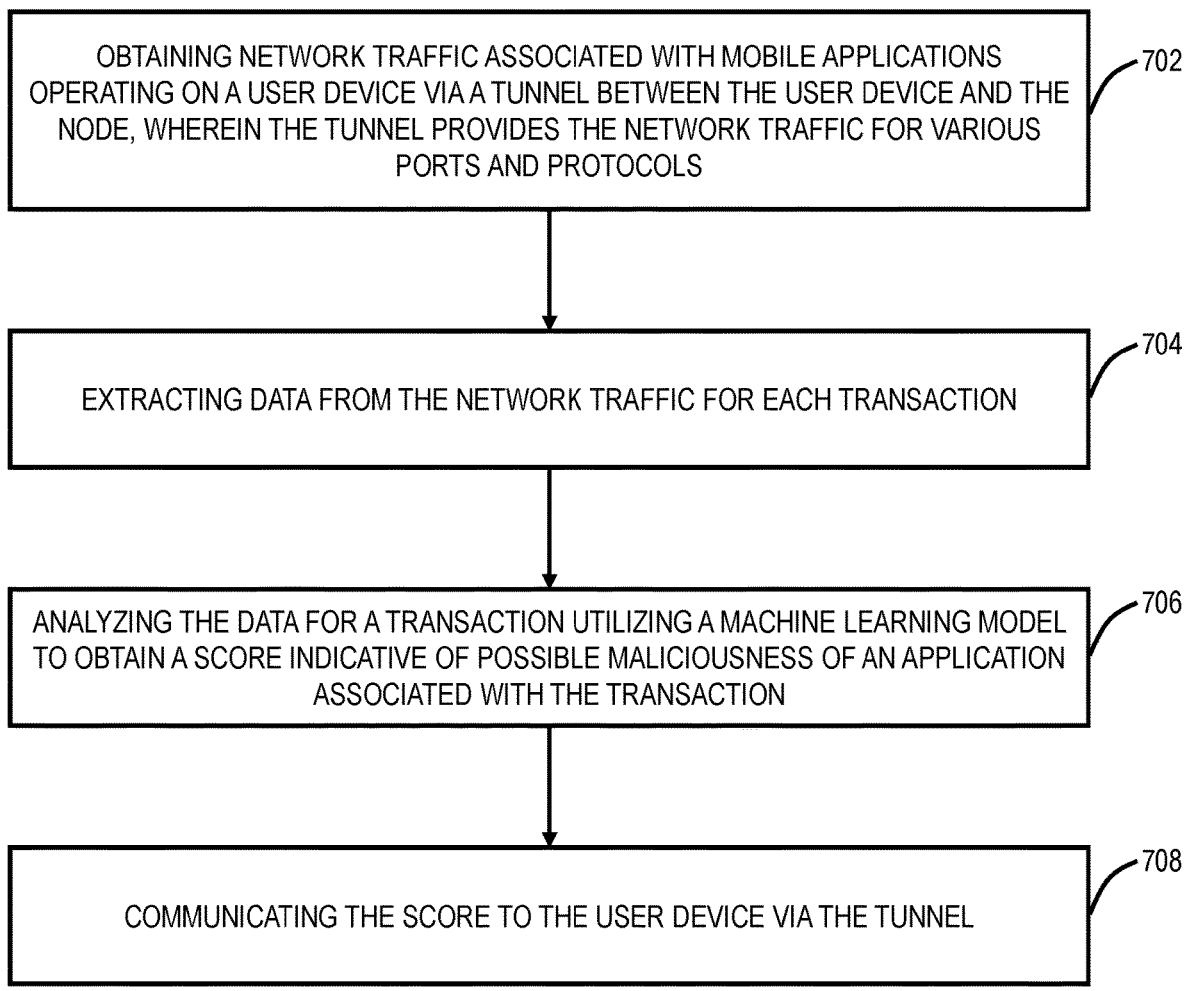
FIG. 10 is a flowchart of a machine learning process implemented in a node in the cloud-based system for classifying mobile apps on a user device.

FIG. 10 is a flowchart of a machine learning process 700 implemented in a node 152 in the cloud-based system 100 for classifying mobile apps on a user device 300. The process 700 contemplates implementation as a method, via the enforcement node 152, and/or as a non-transitory computer-readable medium storing computer-executable instructions. The process 700 includes obtaining network traffic associated with mobile applications operating on a user device via a tunnel between the user device and the node, wherein the tunnel provides the network traffic for various ports and protocols (step 702). The network traffic from all the apps can be forwarded to the cloud-based system 100 using the cloud tunnel 500 and the application 350. The cloud tunnel 500 is a full tunnel that forwards traffic for all ports and protocols and has control and data channels.

An enforcement node 152 can include a module that receives the data traffic and feeds it into a data extraction module. The process 700 includes extracting data from the network traffic for each transaction (step 704). This data extraction module extracts the relevant fields such as destination IP address, destination Port, protocol, user agent, HTTP method, content-length, Server Name Indication (SNI) host, extra header fields, etc. (whichever is relevant for the traffic) from each transaction. This extraction is referred to as data extraction but may also be referred to as feature extraction. Also, the data extraction is performed in the cloud-based system 100, after the cloud tunnel 500 terminates.

The process 700 includes analyzing the data for a transaction utilizing a machine learning model to obtain a score indicative of possible maliciousness of an application associated with the transaction (step 706). Specifically, the data extraction module output is fed to the machine learning model, which is a classifier to provide a score for the transaction. The model can provide a score, such as from 1 to 100, that is indicative of the maliciousness of the application associated with the transaction, e.g., based on the security and privacy parameters.

The process 700 includes communicating the score to the user device via the tunnel (step 708. The score for a transaction is communicated to the user device 300, such as on the control channel 540. The application 350 can then flag the app corresponding to that transaction, including blocking the app, deleting the app, providing a notification, etc. There are more granular controls and scoring that can be done so that the admin can control this. For example, the process 700 can include blocking the application on the user device based on the score. That is, processing and detecting the malicious application is performed in the cloud-based system 100, off of the user device 300, but the user device 300 can perform the remedial action, block, delete, notification, etc. The enforcement node 152 performs the extracting, the analyzing, and training of the machine learning model, and the user device 300 performs blocking of malicious applications based on communication from the cloud-based system 100 via the tunnel 500.

Also, since the cloud-based system 100 is multi-tenant with a significant volume of users 102, the cloud-based system 100 can maintain a list of malicious applications based on monitoring a plurality of users. With the cloud tunnel 500, the enforcement node 152 has visibility of the applications that are on a given user device 300. Thus, the process 70 can include detecting a presence of a malicious application on the user device based on the obtaining network traffic via the tunnel and communicating the malicious application to the user device via the tunnel.

The machine learning model can be periodically trained with supervised and/or unsupervised learning techniques. Various types of models and types of training are contemplated herein. A key aspect of the present disclosure is a global view of a large user 102 base along with the cloud tunnel's 500 ability to detect mobile applications on user devices 300.

The process 700 can include obtaining feedback from a user of the user device based on the score; and labeling the data based on the feedback for training data. That is, the application 350 can include a feedback mechanism where users 102 can provide input that may be used for labels. The process 700 can include updating the machine learning model based on training data obtained from monitoring through the cloud-based system 100.

This architecture solves the following problems that exist in the current solution. This approach performs the complex computations and processing in the cloud-based system 100, off of the user device 300. It is impractical to perform the analyses described herein local on a user device 300, given processing capability, battery concerns, etc. The data extraction, model training and data classification are moved to the cloud-based system 100. The user device 300 receives lightweight updates from the cloud-based system 100 on the control channel 540 to flag a particular app. Here, the user device 300 performs an action based on analysis from the cloud-based system 100. Finally, the machine learning model training and updating are performed without any dependency on the application 350 or coordination with user devices 300.

The machine learning model can be used to detect malicious apps that are security risks as well as privacy risks. In an embodiment, the machine learning model can be trained to detect malicious apps that are security risks. In another embodiment, the machine learning model can be trained to detect malicious apps that are privacy risks. For example, the machine learning model can be configured to flag apps that are leaking location data frequently, sharing financial information, etc. That is one particular problem with mobile apps is the data sharing aspects. Often users click through screens unaware they are providing a mobile app access to location data, financial data, contact lists, etc. Once authorized, malicious mobile apps can leak this data. This aspect of protecting privacy is in line with the DLP aspects of the cloud-based system 100.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read-Only Memory), an EPROM (Erasable Programmable Read-Only Memory), an EEPROM (Electrically Erasable Programmable Read-Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium storing computer-executable instructions, and in response to execution by a node and a user device in a cloud-based system, the computer-executable instructions cause the node to perform steps of:

establishing a cloud tunnel between the node and a connector application executing on the user device, the tunnel defining a first tunnel and a second tunnel, wherein the cloud tunnel comprises one or more data channels for transmitting and receiving user Internet Protocol (IP) packets and a TLS encrypted control channel for mobile device and user authentication and control messages, the one or more data channels being bound to the control channel, and wherein the one or more data channels are bound to the control channel by a session identifier in a device authentication acknowledgement;

obtaining network traffic associated with mobile applications operating on the user device via the one or more data channels of the cloud tunnel, wherein the cloud tunnel provides the network traffic for various ports and protocols via the one or more data channels, and wherein the connector application executing on the user device provides data associated with the network traffic to the node, wherein the data includes destination Internet Protocol (IP) addresses, destination port, protocol, user agent, Hypertext Transport Protocol (HTTP) method, content-length, Server Name Indication (SNI) host, extra header fields, and mobile application identifiers, and wherein the connector application executing on the user device is adapted to derive mobile application names associated with established connections and tag a mobile application identifier on every packet over the data channel to support per-application awareness;

extracting the data from the network traffic for each transaction;

analyzing the data for a transaction utilizing a machine learning model to obtain a score indicative of possible maliciousness of a mobile application associated with the transaction;

communicating the score to the application executing on the user device via the control channel of the tunnel, wherein the control channel of the tunnel is encrypted; and responsive to communicating the score to the application executing on the user device via the control channel of the tunnel, and responsive to the score indicating that the mobile application executing on the user device is a malicious mobile application, causing the application executing on the user device to delete the mobile application from the user device based on the score communicated to the application executing on the user device by the node, thereby deleting the malicious mobile application from the user device.

2. The non-transitory computer-readable medium of claim 1, wherein the steps include receiving feedback at the node from the connector application executing on the user device via a feedback mechanism provided by the connector application executing on the user device based on the score, wherein the feedback includes user provided inputs provided through the feedback mechanism used for labeling data, and wherein the feedback is communicated to the node via the tunnel; and labeling the data based on the feedback for training data.

3. The non-transitory computer-readable medium of claim 1, wherein the steps include updating the machine learning model based on training data obtained from monitoring through the cloud-based system.

4. The non-transitory computer-readable medium of claim 1, wherein the score is a risk score having a range indicative of the degree of maliciousness and wherein the node performs the extracting, the analyzing, the training of the machine learning model, and the execution of the machine learning model, and the application executing on the user device performs blocking of malicious applications responsive to, and based on, communication from the cloud-based system via the tunnel.

5. The non-transitory computer-readable medium of claim 1, wherein the steps include maintaining a list of malicious applications in the cloud-based system based on monitoring a plurality of users;

detecting, in the cloud-based system, a presence of a malicious application on the user device based on the obtaining network traffic via the tunnel;

communicating the malicious application to the application executing on the user device via the tunnel; and causing the application executing on the user device to block the malicious application.

6. The non-transitory computer-readable medium of claim 1, wherein the machine learning model is configured to compute the score for the mobile application based on the mobile application leaking personal data, and wherein the steps include detecting within the network traffic associated with mobile applications operating on the user device any of location data, financial data, and contact data of a user associated with the user device originating from a specific mobile application based on the mobile application identifiers tagged to each packet over the data channel.

7. A cloud-based system comprising:
a central authority node;
a plurality of user devices; and
a plurality of enforcement nodes connected to one another, to the central authority node, and to the plurality of user devices;
wherein an enforcement node is configured to
establishing a cloud tunnel between the node and a connector application executing on the user device, the tunnel defining a first tunnel and a second tunnel, wherein the cloud tunnel comprises one or more data channels for transmitting and receiving user Internet Protocol (IP) packets and a TLS encrypted control channel for mobile device and user authentication and control messages, the one or more data channels being bound to the control channel, and wherein the one or more data channels are bound to the control channel by a session identifier in a device authentication acknowledgement;
obtain network traffic associated with mobile applications operating on the user device via the one or more data channels of the cloud tunnel, wherein the cloud tunnel provides the network traffic for various ports and protocols via the one or more data channels, and wherein the connector application executing on the user device provides data associated with the network traffic to the node, wherein the data includes destination Internet Protocol (IP) addresses, destination port, protocol, user agent, Hypertext Transport Protocol (HTTP) method, content-length, Server Name Indication (SNI) host, extra header fields, and mobile application identifiers, and wherein the connector application executing on the user device is adapted to derive mobile application names associated with established connections and tag a mobile application identifier on every packet over the data channel to support per-application awareness,
extract the data from the network traffic for each transaction,
analyze the data for a transaction utilizing a machine learning model to obtain a score indicative of possible maliciousness of a mobile application associated with the transaction, and
communicate the score to the application executing on the user device via the control channel of the tunnel, wherein the control channel of the tunnel is encrypted,
wherein the application executing on the user device is configured to
responsive to the score indicating that the mobile application executing on the user device is a malicious mobile application, delete the mobile application from the user device based on the score communicated to the application executing on the user device via the control channel of the tunnel from the enforcement node, thereby deleting the malicious mobile application from the user device.

8. The cloud-based system of claim 7, wherein the enforcement node is configured to
receive feedback at the node from the connector application executing on the user device via a feedback mechanism provided by the connector application executing on the user device based on the score, wherein the feedback includes inputs provided through the feedback mechanism used for labeling data, and wherein the feedback is communicated to the node via the tunnel; and
label the data based on the feedback for training data.

9. The cloud-based system of claim 7, wherein the enforcement node is configured to
update the machine learning model based on training data obtained from monitoring through the cloud-based system.

10. The cloud-based system of claim 7, wherein the steps include
maintaining a list of malicious applications in the cloud-based system based on monitoring a plurality of users;
detecting, in the cloud-based system, a presence of a malicious application on the user device based on the obtaining network traffic via the tunnel;
communicating the malicious application to the application executing on the user device via the tunnel; and
causing the application executing on the user device to block the malicious application.

11. A method performed by a node and a user device in a cloud-based system comprising:
establishing a tunnel between the node and a connector application executing on the user device, wherein the tunnel comprises one or more data channels for transmitting and receiving user Internet Protocol (IP) packets and a control channel for device and user authentication and control messages, the one or more data channels being bound to the control channel, and wherein the one or more data channels are bound to the control channel by a session identifier in a device authentication acknowledgement;
obtaining network traffic associated with mobile applications operating on the user device via the one or more data channels of the tunnel, wherein the tunnel provides the network traffic for various ports and protocols via the one or more data channels, and wherein the connector application executing on the user device provides data associated with the network traffic to the node, wherein the data includes destination Internet Protocol (IP) addresses, destination port, protocol, user agent, Hypertext Transport Protocol (HTTP) method, content-length, Server Name Indication (SNI) host, extra header fields, and mobile application identifiers, and wherein the connector application executing on the user device is adapted to derive mobile application names associated with established connections and tag a mobile application identifier on every packet over the data channel to support per-application awareness;
extracting the data from the network traffic for each transaction;
analyzing the data for a transaction utilizing a machine learning model to obtain a score indicative of possible maliciousness of a mobile application associated with the transaction;

communicating the score to the application executing on the user device via the control channel of the tunnel, wherein the control channel of the tunnel is encrypted; and responsive to the score indicating that the mobile application executing on the user device is a malicious mobile application, deleting the mobile application from the user device based on the score communicated to the application executing on the user device via the control channel of the tunnel, wherein the application executing on the user device is adapted to perform the deleting of the mobile application, thereby deleting the malicious mobile application from the user device.

12. The method of claim 11, comprising receiving feedback at the node from the connector application executing on the user device via a feedback mechanism provided by the connector application executing on the user device based on the score, wherein the feedback includes inputs provided through the feedback mechanism used for labeling data, and wherein the feedback is communicated to the node via the tunnel; and labeling the data based on the feedback for training data.

13. The method of claim 11, comprising updating the machine learning model based on training data obtained from monitoring through the cloud-based system.

14. The non-transitory computer-readable medium of claim 1, wherein the node is a cluster of servers, and wherein steps include:

performing load balancing to spread the cloud tunnels from a single source IP address between the node and the user device by utilizing the cluster of servers for transmitting and receiving IP packets via the one or more data channels, wherein the one or more data channels are communicatively coupled to different servers of the cluster of servers.

\* \* \* \* \*